United States Patent
Berkun

(10) Patent No.: US 8,960,554 B2
(45) Date of Patent: Feb. 24, 2015

(54) BAR CODE SYSTEM INCLUDING NETWORK ACKNOWLEDGEMENT

(71) Applicant: Labels That Talk, Ltd, Redmond, WA (US)

(72) Inventor: Kenneth A. Berkun, Kailua, HI (US)

(73) Assignee: Labels That Talk, Ltd, Redmond, WA (US)

( * ) Notice: Subject to any disclaimer, the term of this patent is extended or adjusted under 35 U.S.C. 154(b) by 0 days.

(21) Appl. No.: 14/025,014

(22) Filed: Sep. 12, 2013

(65) Prior Publication Data

US 2014/0069998 A1    Mar. 13, 2014

Related U.S. Application Data

(60) Provisional application No. 61/700,219, filed on Sep. 12, 2012.

(51) Int. Cl.
    G06K 19/00    (2006.01)
    G06F 17/00    (2006.01)
    G06K 19/06    (2006.01)
    G06K 7/14     (2006.01)
    H04W 4/00     (2009.01)

(52) U.S. Cl.
    CPC ........ G06K 19/06056 (2013.01); G06K 7/1434 (2013.01); H04W 4/00 (2013.01)

USPC ............................................ 235/487; 235/375

(58) Field of Classification Search
    CPC ................................................ G06F 17/30879
    USPC ................................... 235/487, 375, 454
    See application file for complete search history.

(56) References Cited

U.S. PATENT DOCUMENTS

| 5,938,727 A | 8/1999 | Ikeda |
| 6,772,947 B2 | 8/2004 | Shaw |
| 2010/0070364 A1 | 3/2010 | Dugan |

FOREIGN PATENT DOCUMENTS

KR    100764463    10/2007

OTHER PUBLICATIONS

Zhou Ping et al., "Applications of 2D Barcode for Mobile Tagging," Advanced Materials Research vol. 174 (2011) pp. 171-174.
Briseno et al., Using RFID/NFC and QR-Code in Mobile Phones to Link the Physical and the Digital World, Interactive Multimedia, Published Mar. 7, 2012, pp. 219-242.

*Primary Examiner* — Jamara Franklin
(74) *Attorney, Agent, or Firm* — Christopher A. Wiklof; Launchpad IP, Inc.

(57) ABSTRACT

A bar code symbol may include decode network response state configured to cause a bar code decoder to transmit a decode acknowledgement to a networked server computer corresponding to an acknowledgement address.

39 Claims, 3 Drawing Sheets

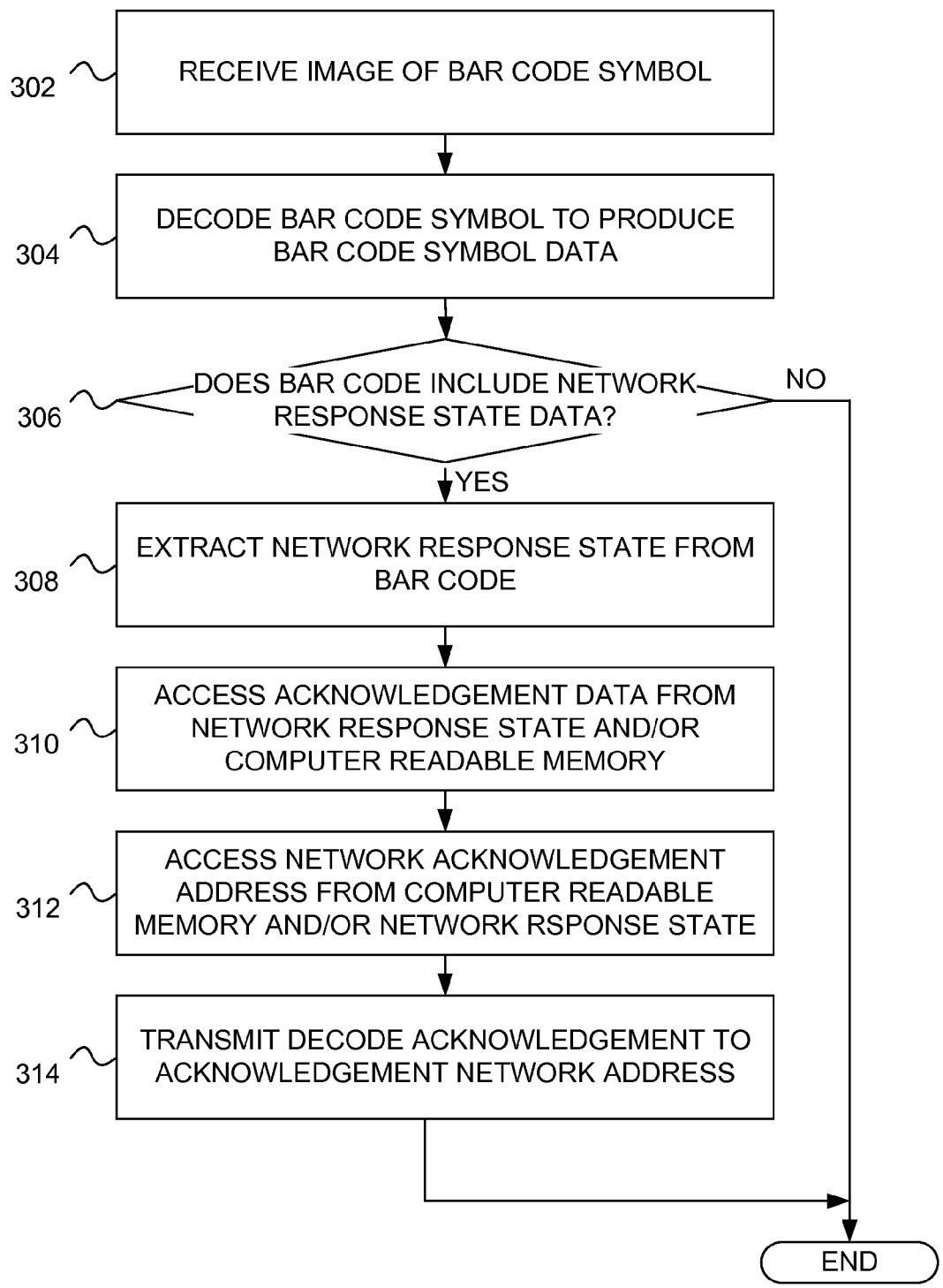

BAR CODE SYSTEM INCLUDING NETWORK ACKNOWLEDGEMENT

CROSS-REFERENCE TO RELATED APPLICATIONS

The present application claims priority benefit from U.S. Provisional Patent Application No. 61/700,219, entitled "BAR CODE SYMBOL AND SYSTEM FOR USING A BAR CODE SYMBOL WITH EMBEDDED DECODE ACKNOWLEDGEMENT DATA", filed Sep. 12, 2012; which, to the extent not inconsistent with the disclosure herein, is incorporated by reference.

SUMMARY

According to an embodiment, a bar code symbol is scanned. The bar code symbol can include a linear, two-dimensional (2D) stacked, 2D matrix, glyph field, two-state, or color symbol. In another embodiment, an image including a visible data field or steganographically encoded network response data is scanned.

Data corresponding to a network response state is decoded (from the payload data, header data, or symbol overhead, for example) and transferred to an instruction buffer. An end device (which may include scanner hardware and software) executes a network call corresponding to the decoded network response state. For example the network call can cause a network web page to be accessed. Data related to the scan event such as: symbol identity (ID) (e.g., a serialized data field), location, orientation, time, device ID, user ID, anonymized device ID, anonymized user ID, or device scan sequence can be transmitted to the web page. The network call can be transparent to the user. In a particular embodiment, the web page can include a null display state. In another particular embodiment, an application (e.g., a "mobile app") can interface with the web page without displaying the web page and optionally without reporting existence of the act of accessing the web page to a user interface.

In an embodiment, a mobile device includes a camera and microcomputer. The microcomputer can include a non-transitory computer readable media configured to carry computer readable instructions corresponding to an operating system such as a mobile operating system. The mobile operating system includes a capability to run a mobile app or OS-embedded functionality corresponding to bar code symbol data including the network response state.

In another embodiment, a mobile app presents a GUI corresponding to the network web page. In another embodiment, a scanning mobile app recovers the network response state and calls a web browser using the network response state as a portion of network address data. For example, the network response state can include a URL or an IP (e.g., IPv4 or IPv6) address, and/or an extension to a URL address or IP address accessible to the mobile app. In an embodiment, the mobile app presents media data corresponding to payload data. In an embodiment, the mobile app presents media data corresponding to payload data, and: an icon corresponding to the network response state, an icon corresponding to a scanning software vendor, or display field corresponding to a user-selected network response.

The user-selected network response can include a non-response.

The mobile app can include a user-accessible preference or preference list. For example, the user-selected preference can include a preference to cause the mobile app to not respond to the network response state. In another embodiment, the user-selected preference can include a first portion of chosen network address. A second portion of the chosen network address can consist essentially of data corresponding to the response state.

According to an embodiment, a bar code symbol is configured for decode acknowledgement. The bar code symbol can include printed symbol overhead and printed symbol payload data associated with the printed symbol overhead. In one embodiment, network response state is associated with the printed symbol overhead. For example the network response state can be encoded in symbol header data. In another example, network response state can be encoded in a symbol finder pattern. In another embodiment, network response state is included in printed symbol payload data. For example, the network response state can be included as a structured data field. In another example, acknowledgment data is included in metadata associated with the symbol payload data.

According to an embodiment, a system is configured to provide decode acknowledgement of a bar code symbol. A personal electronic device includes a microprocessor operatively coupled to computer memory, a camera, and a network interface. A server computer is operatively coupled to a network. The network is at least intermittently operatively coupled to the network interface of the personal electronic device. The server computer is assigned an acknowledgement network address. An application program stored on the computer memory of the personal electronic device may be configured to receive a user command via a user interface of the personal electronic device to read a bar code symbol. The application program may cause the personal electronic device to responsively capture an image of the bar code symbol, decode the bar code symbol to produce bar code symbol data, extract network response state from the bar code symbol data or from bar code symbol overhead, and cause the personal electronic device, via the network interface (or another device operatively coupled to the personal electronic device), to transmit a decode acknowledgement to the acknowledgement network address assigned to the server computer.

BRIEF DESCRIPTION OF THE DRAWINGS

FIG. 3 is a flowchart showing a method for acknowledging decoding of a bar code symbol, according to an embodiment.

DETAILED DESCRIPTION

Figure 1:
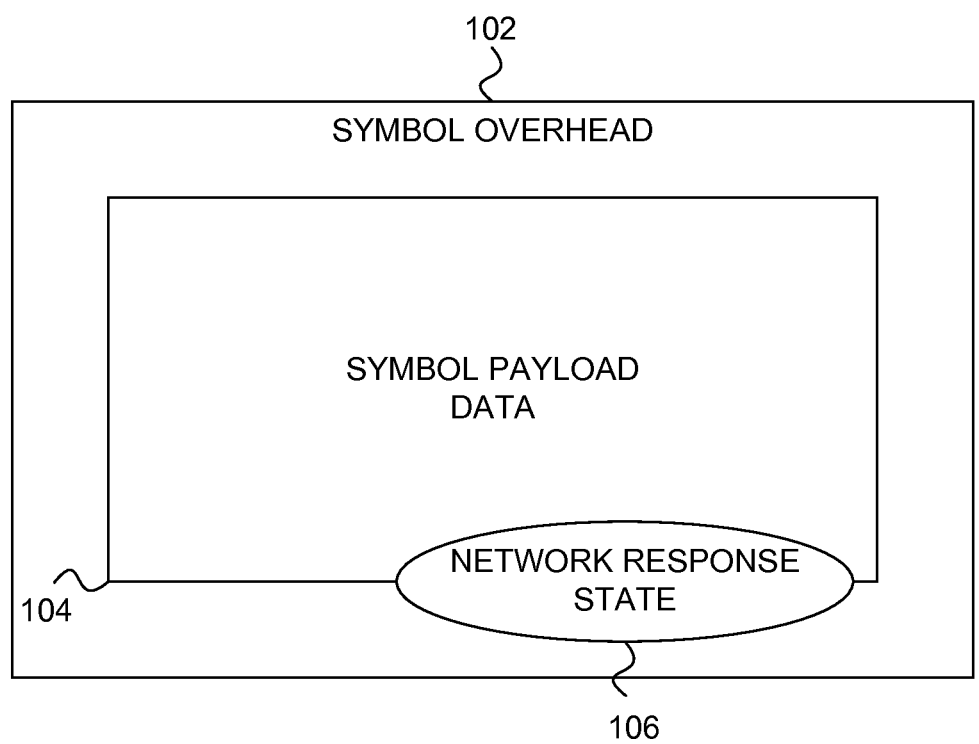
FIG. 1 is a conceptual diagram of a bar code symbol including data selected to cause a system to acknowledge decoding the bar code symbol, according to an embodiment.

In the following detailed description, reference is made to the accompanying drawings, which form a part hereof. In the drawings, similar symbols typically identify similar components, unless context dictates otherwise. Other embodiments may be used and/or other changes may be made without departing from the spirit or scope of the disclosure.

FIG. 1 is a conceptual diagram of a bar code symbol 100 depicting a data structure contained within the bar code symbol, according to an embodiment.

The bar code symbol 100 is configured for decode acknowledgement. The bar code symbol 100 includes printed symbol overhead 102, a printed symbol payload data 104 associated with the printed symbol overhead 102, and network response state data 106. As used herein, "an acknowledgement message" is data transmitted from a symbol reader across a network to a remote resource. "Network response state data", or less verbosely a "network response state" is carried by the bar code symbol 100. The network response state can be carried as all or a part of the acknowledgement message. The acknowledgement message can also carry acknowledgement data that is carried by and read from a non-transitory computer readable memory. In an embodiment, the network response state can consist essentially of as little as one bit of data (although the number of pixels used to encode the network response state can include a number greater than the number of bits encoded). In other embodiments, the network response state can include greater than one bit of data. The network response state includes data indicating that acknowledgement data is intended to be transmitted from a capture and/or decode apparatus to the remote resource upon capturing (and optionally, decoding) the bar code symbol. Acknowledgement data sent to a network resource indicates the symbol 100 has been scanned.

The network response state 106 can include a flag character (or image portion) indicating that acknowledgement data is to be sent. In the case of a low information content network response state 106, for example, the network response state 106 can be present in a symbol finder pattern used to decode a bar code symbol, but not actually included in decoded data. Accordingly, the network response state may, in some embodiments, be recovered from the bar code image, but not from decoded bar code data.

In another embodiment, the network response state 106 can include data used to transmit a decode acknowledgement. For example, the network response state 106 can include a URL or an IP address (e.g., IPv4 or IPv6), and/or an extension to a URL address or IP address to which the decode acknowledgement is intended to be transmitted.

In another embodiment, the network response state 106 can include data that is intended to be transmitted to a remote resource as part of the decode acknowledgement. For example, the network response state 106 can include data that uniquely identifies a particular bar code symbol 100, or alternatively that indicates a population to which the particular bar code symbol 100 belongs. As is described in more detail below, additional data can be collected to construct a decode acknowledgement. For example, stored data can be read from a user apparatus and processed into a decode acknowledgement message, either added to (e.g., concatenated with) network response state data or without additional data corresponding to the network response state.

In some embodiments, a local software application acts to transmit a decode acknowledgement automatically responsive to a network response state 106, without user intervention or knowledge. In some embodiments, the local software application receives a user preference that allows the automatic decode acknowledgement or that suppresses the automatic decode acknowledgement. In some embodiments, a user can allow or disallow transmitting a decode acknowledgement for individual symbol scanning events.

In one embodiment, the network response state 106 is associated with the printed symbol overhead 102. In another embodiment, the network response state 106 is associated with the payload data 104. The bar code symbol 100 can include a linear bar code symbol. In other examples, the bar code symbol 100 can include a two-dimensional (2D) stacked bar code symbol, a 2D matrix bar code symbol, a binary symbol or a color-coded symbol, and/or a glyph field.

According to an embodiment, a conventional bar code symbol 100 can be substituted with another printed image that carries network response state data 106. For example, a printed image can include a visible data field such as a user-readable field corresponding to the network response state 106. Alternatively, a printed image can include a network response state encoded as steganographic data. Upon capturing the printed image with digital camera or other end device capture apparatus, a local application can perform steganalysis to extract the network response state.

For ease of understanding, embodiments herein are described as corresponding to a bar code symbol. It will be understood, unless stated explicitly to the contrary, that corresponding embodiments to a non-bar code printed image also fall within the scope of this disclosure.

The network response state 106 can be disposed in the printed symbol overhead 102 such as a bar code finder pattern or in bar code symbol header data. Alternatively, network response state 106 can be disposed in the printed symbol payload data 104. The printed symbol payload data 104 may include error detection data, according to embodiments. The network response state 106 may be disposed in the error detection data. The printed symbol payload data 104 may include error correction data. The network response state 106 may be disposed in the error correction data.

Figure 2:
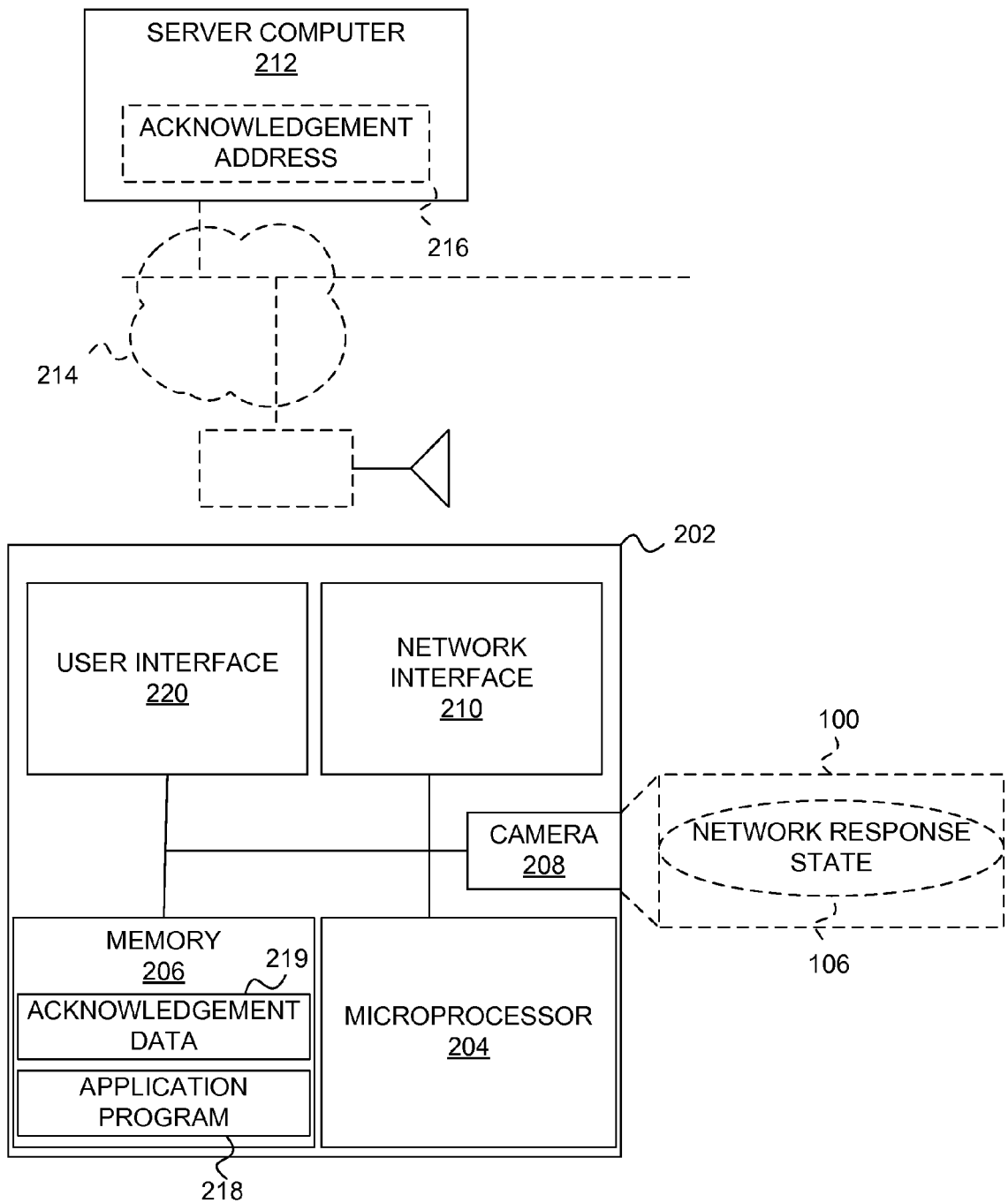
FIG. 2 is a block diagram of a system configured to provide decode acknowledgement of a bar code symbol, according to an embodiment.

In some embodiments, the network response state 106 includes as little as one bit of data selected to cause bar code decoder software to access a stored acknowledgement network address 216 (see FIG. 2). Additionally or alternatively, the network response state 106 can include at least a portion of an acknowledgement network address 216. For example, a first portion of the acknowledgement network address 216 can be stored in the end device, for example as a default application setting and/or as a user-selected setting, and a second portion of the acknowledgement network address can be received from the bar code 102 image or from decoded bar code data as the network response state 106. In one embodiment, the network response state includes an extension to a surface web page that is dynamically assigned and/or non-linked from the surface web page.

The network response state 106 may include a symbol identification, such as a symbol serial number, for example. The network response state 106 may include a symbol provider identification. For example, the symbol provider identification may include the identification of a sales organization or a salesperson who provided to the user a sales brochure carrying the bar code symbol 100.

Acknowledgement data transmitted in a decode acknowledgement can also include information received from a user device. For example, information received from the user device can include an user identification, a device identification, a software serial number, a software version, and/or other data carried by a non-transitory computer readable medium in the user device. User identification or other specific identification may be personally identifying or may be anonymous.

FIG. 2 is a block diagram of a system 200 configured to provide decode acknowledgement of a bar code symbol 100, according to an embodiment. A personal electronic device 202 includes a microprocessor 204 operatively coupled to computer memory 206, a camera 208, and a network interface 210. A server computer 212 is operatively coupled to a network 214. The network interface 210 of the personal electronic device 210 is at least intermittently operatively coupled to the network 214. The server computer 212 can be assigned an acknowledgement network address 216. An application program 218 carried by the computer memory 206 of the personal electronic device 202 can be configured to receive a user command via a user interface 220 to read a bar code symbol 100. The computer memory 206 can carry an application program 218 including computer executable instructions to transmit a decode acknowledgement. The computer memory 206 can optionally carry acknowledgement data 219 for transmitting as at least a portion of the decode acknowledgement. The application program 218 can cause the personal electronic device 202 to responsively capture an image of the bar code symbol 100, decode the bar code symbol 100 to produce bar code symbol data, extract a network response state 106 from the bar code symbol data (or alternatively, from a non-decoded portion of the image of the bar code symbol 100 such as a finder pattern), optionally read acknowledgement data 219 from the computer memory 206, and cause the personal electronic device 202, via the network interface 210 (or another device operatively coupled to the personal electronic device 202), to transmit a decode acknowledgement to the acknowledgement network address 216 assigned to the server computer 212.

FIG. 3 is a flowchart showing a method 300 for acknowledging decoding of a bar code symbol, according to an embodiment. The bar code symbol can include a linear bar code symbol, a two-dimensional (2D) stacked bar code symbol, a 2D matrix bar code symbol, and/or a glyph field, for example. As described above, in some embodiments, the method 300 can be used for acknowledging capture of (and network response state extraction from) a printed image other than a bar code symbol.

In step 302, an image of a bar code symbol is received. Receiving an image of a bar code symbol can include capturing the image of the bar code symbol. Additionally or alternatively, for example if some or all of the method 300 is performed remotely from a local image capture device (such as remotely from personal electronic device including a digital camera), receiving the image of the bar code symbol can include receiving the captured image from another device. For example, the method 300 may be performed by a server computer operatively coupled to a personal electronic device via a network.

In step 304, the image of the bar code symbol is decoded to produce bar code symbol data. In optional step 306, it may be determined whether the bar code symbol includes network response state. If there is no network response state in the bar code symbol, the method 300 proceeds to an end condition. Additionally or alternatively, optional step 306 can include determining a user preference with respect to transmitting a decode acknowledgement. If the user chooses not to transmit decode acknowledgement, then the method 300 proceeds to the end condition. After proceeding to the end condition, the decoded bar code symbol data may be processed according to conventional methods.

If there is network response state in the bar code symbol (and if the user opts in or does not opt out regarding network acknowledgement), the method 300 proceeds from step 306 to step 308.

In step 308, network response state is extracted from the bar code symbol. As described above, step 308 may be performed conditionally, responsive to the output of step 306 such that extracting network response state in step 308 occurs if the bar code symbol includes network response state and if the user prefers to extract the network response state. Optionally, step 306, wherein it is determined if the bar code symbol data includes network response state, and step 308, wherein the network response state is extracted from the bar code symbol data may occur substantially simultaneously. For example, determining if the bar code symbol data includes network response state in step 306 may include attempting to extract the network response state from the symbol data in step 308.

According to embodiments, the network response state may take various forms. The network response state can include as little as one bit of data selected to cause a bar code decoder software application including a stored address to access the acknowledgement network address corresponding to the stored network address. In other words, the network response state may consist essentially of flag data selected to cause the bar code decoder software application to look up a stored network address and transmit a decode acknowledgement to the stored network address. In other embodiments, the network response state may include at least a portion of the acknowledgement network address. For example, the network response state can include substantially an entirety of the acknowledgement network address. In another example, a software application can provide a first part of a network address (which may, for example, be indexed and static), and the network response state can provide a second part of the network address. The second part of the network address can by dynamic and/or non-linked from the first part of the network address.

The network response state can additionally or alternatively include data that is transmitted in a decode acknowledgement.

The network response state can be disposed in bar code symbol overhead data. Additionally or alternatively, the network response state may be disposed in bar code symbol header data. Additionally or alternatively, the network response state may be disposed in bar code symbol payload data. Optionally, the network response state may be disposed in bar code symbol error detection data or error correction data. Additionally or alternatively, the network response state can be disposed in a symbol finder pattern.

In optional step 310, acknowledgement data is established. Step 310 can include parsing the network response state to produce acknowledgement data or using the network response state as acknowledgement data. For example, the network response state can include a symbol identity, a symbol provider identity, or other types of data provided in the bar code symbol. Step 310 can also include accessing acknowledgement data from computer readable memory. For example, acknowledgement data carried by the computer readable memory can include a user identity, a device identity, location services data, time data, scan sequence data, or other types of data that can be tracked or maintained by the electronic device. Step 310 can further include combining data from the network response state and the acknowledgement data to produce an acknowledgement message. For example, data from the network response state can be concatenated with the acknowledgement data to form the acknowledgement message. The acknowledgement data carried by the computer readable memory can be accessed from a secret data location in a personal electronic device memory or in a database provided by the bar code decoder software vendor.

Proceeding to step 312, an acknowledgement network address corresponding to the network response state is accessed. As described above, the network response state 106 may include as little as one bit of data selected to cause bar code decoder software to access the stored acknowledgement network address. Additionally or alternatively, the network response state may include at least a portion of the acknowledgement network address. Also as described above, the network response state may be stored in various locations and/or forms in the bar code symbol. For example, the network response state may be disposed in the printed symbol overhead. The printed symbol overhead may include a bar code symbol header data. The network response state may be disposed in the bar code symbol header data. Additionally or alternatively, the network response state may be disposed in the printed symbol payload data. The printed symbol payload data may include error detection data, according to embodiments. The network response state 106 may be disposed in the error detection data. The printed symbol payload data may include error correction data. The network response state 106 may be disposed in the error correction data. Accessing the acknowledgement network address may include extracting the acknowledgement network address from one or more of various portions of the bar code symbol data.

Proceeding to step 314, a decode acknowledgement is transmitted to the acknowledgement network address. The decode acknowledgement can include an acknowledgement message established in step 310. For some embodiments where step 310 is included, transmitting a decode acknowledgement to the acknowledgement network address may include transmitting the user identification. The user identification may include data that is not a personal identification of the user (e.g., is anonymized). For example, the user identification may include a user alias or a serial number associated with the bar code decoding software application. Alternatively, the user identification may include data that personally identifies the user. Step 310 may additionally or alternatively include accessing a device identification. Transmitting a decode acknowledgement to the acknowledgement network address may include transmitting the device identification. For some embodiments where step 310 is included, transmitting a decode acknowledgement to the acknowledgement network address may include transmitting the printed symbol identification. For some embodiments where step 310 is included, transmitting a decode acknowledgement to the acknowledgement network address may include transmitting the symbol provider identification.

In other words, step 310 may include accessing one or more of user data, printed symbol identification, or symbol provider identification. Step 314, wherein a decode acknowledgement to the acknowledgement network address, may include transmitting one or more of the user data, printed symbol identification, or symbol provider identification to the acknowledgement network address or to another network address.

Step 314 may include sending a ping command to the acknowledgement network address, may include sending another acknowledgement message to the acknowledgement network address, may include saving network response state and/or symbol data to memory for later transmission to the acknowledgement network address, and/or may include transmission of additional data. In addition to or alternatively to the various types of data described above, the additional data transmission may include transmitting a location of the scanning (which may, for example, be obtained from a location services resource), a time and/or date of scanning, and/or other data that may be accessed on a portable electronic device or a database operatively coupled to the portable electronic device.

After execution of step 314, the method 300 may proceed to an end state. After passing control to the end state, the bar code data may be processed according to conventional approaches.

Some or all of the method steps and/or functions described herein may be embodied as a non-transitory computer-readable medium carrying computer-executable instructions configured to cause a bar code reading apparatus, server, and/or system including a bar code reading apparatus to execute the steps of the method and/or functions.

While various aspects and embodiments have been disclosed herein, other aspects and embodiments are contemplated. The various aspects and embodiments disclosed herein are for purposes of illustration and are not intended to be limiting, with the true scope and spirit being indicated by the following claims.

What is claimed is:

1. A bar code symbol configured for decode acknowledgement, comprising:
   printed symbol overhead;
   printed symbol payload data associated with the printed symbol overhead; and
   network response state associated with the printed symbol overhead or the printed symbol payload data.

2. The bar code symbol configured for decode acknowledgement of claim 1, wherein the bar code symbol includes a linear bar code symbol, a two-dimensional (2D) stacked bar code symbol, or a 2D matrix bar code symbol.

3. The bar code symbol configured for decode acknowledgement of claim 1, wherein the network response state is disposed in the printed symbol overhead.

4. The bar code symbol configured for decode acknowledgement of claim 1, wherein the printed symbol overhead includes bar code symbol header data; and
   wherein the network response state is disposed in the bar code symbol header data.

5. The bar code symbol configured for decode acknowledgement of claim 1, wherein the network response state is disposed in the printed symbol payload data.

6. The bar code symbol configured for decode acknowledgement of claim 1, wherein the printed symbol payload data includes bar code symbol header data; and
   wherein the network response state is disposed in the bar code symbol header data.

7. The bar code symbol configured for decode acknowledgement of claim 1, wherein the printed symbol payload data includes error detection data; and
   wherein the network response state is disposed in the error detection data.

8. The bar code symbol configured for decode acknowledgement of claim 1, wherein the printed symbol payload data includes error correction data; and
   wherein the network response state is disposed in the error correction data.

9. The bar code symbol configured for decode acknowledgement of claim 1, wherein the network response state includes at least one bit of data selected to cause bar code decoder software to access a stored acknowledgement network address.

10. The bar code symbol configured for decode acknowledgement of claim 1, wherein the network response state includes at least a portion of an acknowledgement network address.

11. The bar code symbol configured for decode acknowledgement of claim 1, wherein the network response state includes a user identification.

12. The bar code symbol configured for decode acknowledgement of claim 1, wherein the network response state includes a user identification that is anonymous.

13. The bar code symbol configured for decode acknowledgement of claim 1, wherein the network response state includes a printed symbol identification.

14. The bar code symbol configured for decode acknowledgement of claim 1, wherein the network response state includes a symbol provider identification.

15. A system configured to provide decode acknowledgement of a bar code symbol, comprising:

a personal electronic device including a microprocessor operatively coupled to computer memory, a camera, and a network interface;

a server computer operatively coupled to a network,
the network being at least intermittently operatively coupled to the network interface of the personal electronic device, and
the server computer being assigned an acknowledgement network address; and an application program stored on the computer memory, the application program being configured to:
receive a user command via a user interface to read a bar code symbol, and responsively
capture an image of the bar code symbol,
decode the bar code symbol to produce bar code symbol data,
extract network response state from the bar code symbol data, and
cause the personal electronic device via the network interface or another device operatively coupled to the personal electronic device to transmit to the acknowledgement network address a decode acknowledgement message.

16. A method for reading a bar code symbol, comprising: receiving an image of a bar code symbol;
decoding the image of the bar code symbol to produce bar code symbol data;
extracting network response state from the bar code symbol data;
accessing an acknowledgement network address corresponding to the network response state; and
transmitting a decode acknowledgement to the acknowledgement network address.

17. The method for reading a bar code symbol of claim 16, wherein receiving an image of a bar code symbol includes capturing the image of the bar code symbol.

18. The method for reading a bar code symbol of claim 16, wherein the bar code symbol includes a linear bar code symbol, a two-dimensional (2D) stacked bar code symbol, or a 2D matrix bar code symbol.

19. The method for reading a bar code symbol of claim 16, further comprising determining if the bar code symbol data includes network response state.

20. The method for reading a bar code symbol of claim 19, wherein extracting network response state occurs if the bar code symbol includes network response state.

21. The method for reading a bar code symbol of claim 19, wherein the steps of determining if the bar code symbol data includes network response state and extracting network response state occur substantially simultaneously.

22. The method for reading a bar code symbol of claim 19, wherein determining if the bar code symbol data includes network response state comprises attempting to extract the network response state from the symbol data.

23. The method for reading a bar code symbol of claim 16, wherein the network response state includes at least one bit of data selected to cause a bar code decoder software application including a stored address to access the acknowledgement network address corresponding to stored network address.

24. The method for reading a bar code symbol of claim 16, wherein the network response state includes at least a portion of the acknowledgement network address.

25. The method for reading a bar code symbol of claim 24, wherein the network response state includes substantially an entirety of the acknowledgement network address.

26. The method for reading a bar code symbol of claim 16, wherein the network response state is disposed in bar code symbol overhead data.

27. The method for reading a bar code symbol of claim 16, wherein the network response state is disposed in bar code symbol header data.

28. The method for reading a bar code symbol of claim 16, wherein the network response state is disposed in bar code symbol payload data.

29. The method for reading a bar code symbol of claim 16, wherein the network response state is disposed in bar code symbol error detection or error correction data.

30. The method for reading a bar code symbol of claim 16, further comprising:
accessing a user identification; and
wherein transmitting a decode acknowledgement to the acknowledgement network address includes transmitting the user identification.

31. The method for reading a bar code symbol of claim 30, wherein the user identification includes data that is not a personal identification of the user.

32. The method for reading a bar code symbol of claim 30, wherein the user identification includes a user alias.

33. The method for reading a bar code symbol of claim 30, wherein the user identification includes data that personally identifies the user.

34. The method for reading a bar code symbol of claim 16, further comprising:
accessing a device identification; and
wherein transmitting a decode acknowledgement to the acknowledgement network address includes transmitting the device identification.

35. The method for reading a bar code symbol of claim 16, further comprising:
accessing printed symbol identification; and
wherein transmitting a decode acknowledgement to the acknowledgement network address includes transmitting the printed symbol identification.

36. The method for reading a bar code symbol of claim 16, further comprising:
accessing a symbol provider identification; and
wherein transmitting a decode acknowledgement to the acknowledgement network address includes transmitting the symbol provider identification.

37. The method for reading a bar code symbol of claim 16, further comprising:
accessing one or more of user data, printed symbol identification, or symbol provider identification.

38. The method for reading a bar code symbol of claim 37, wherein transmitting a decode acknowledgement to the acknowledgement network address includes transmitting one or more of the user data, printed symbol identification, or symbol provider identification to the acknowledgement network address or to another network address.

39. A non-transitory computer-readable medium carrying computer-executable instructions configured to cause a bar code reading apparatus to execute the steps comprising:
receiving an image of a bar code symbol;
decoding the image of the bar code symbol to produce bar code symbol data;
extracting network response state from the bar code symbol data;
accessing an acknowledgement network address corresponding to the network response state; and transmitting a decode acknowledgement to the acknowledgement network address.

\* \* \* \* \*